United States Patent
Cote et al.

(10) Patent No.: US 10,013,697 B1
(45) Date of Patent: Jul. 3, 2018

(54) SYSTEMS AND METHODS FOR MANAGING AND PROCESSING VEHICLE OPERATOR ACCOUNTS BASED ON VEHICLE OPERATION DATA

(71) Applicant: STATE FARM MUTUAL AUTOMOBILE INSURANCE COMPANY, Bloomington, IL (US)

(72) Inventors: Kerry Cote, Bloomington, IL (US); Nicholas R. Baker, Normal, IL (US); Mark E. Clauss, Bloomington, IL (US); Todd Binion, Bloomington, IL (US); Andrea Lee Rhoades, Atlanta, IL (US); Steven J. Balbach, Bloomington, IL (US); Brian Mark Fields, Normal, IL (US); Kyle Pott, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 182 days.

(21) Appl. No.: 14/843,489

(22) Filed: Sep. 2, 2015

(51) Int. Cl.
*G06Q 30/00* (2012.01)
*G06Q 30/02* (2012.01)

(52) U.S. Cl.
CPC ............................... *G06Q 30/0207* (2013.01)

(58) Field of Classification Search
CPC .................................................. G06Q 30/0207
USPC ......................................................... 705/14
See application file for complete search history.

(56) References Cited

U.S. PATENT DOCUMENTS

| | | | | |
|---|---|---|---|---|
| 6,714,894 B1* | 3/2004 | Tobey | ................... | G06Q 40/00 |
| | | | | 702/182 |
| 6,988,034 B1* | 1/2006 | Marlatt | .................. | G06Q 10/02 |
| | | | | 701/468 |
| 7,117,075 B1* | 10/2006 | Larschan | ............... | G06Q 10/06 |
| | | | | 340/438 |
| 8,606,492 B1* | 12/2013 | Botnen | .................. | G07C 5/008 |
| | | | | 701/123 |
| 8,751,563 B1* | 6/2014 | Warden et al. | ............... | 709/203 |
| 9,086,948 B1* | 7/2015 | Slusar et al. | | |
| 9,141,995 B1* | 9/2015 | Brinkmann et al. | | |
| 9,147,353 B1* | 9/2015 | Slusar | | |
| 9,272,713 B1* | 3/2016 | Dvoskin | ............... | B60W 40/08 |
| 2008/0188217 A1* | 8/2008 | Harter | .................... | G06Q 10/08 |
| | | | | 455/426.1 |
| 2010/0030582 A1* | 2/2010 | Rippel | ................... | G06Q 10/10 |
| | | | | 705/4 |
| 2011/0046845 A1* | 2/2011 | Kozlay | .................. | G06Q 10/06 |
| | | | | 701/31.4 |

(Continued)

*Primary Examiner* — Matthew L Hamilton
(74) *Attorney, Agent, or Firm* — Marshall, Gerstein & Borun LLP; Randall G. Rueth

(57) ABSTRACT

Methods and systems for analyzing vehicle operation data associated with a temporary or periodic usage of a vehicle by a driver. In aspects, the driver may associate with an electronic device within the vehicle that may record or collect the vehicle operation data. After the vehicle operation has concluded, the vehicle operation data may be analyzed to assess a performance of the driver during operation of the vehicle, whereby the performance may be influenced by positive or negative driving events. Based on the performance of the driver, a profile or account of the user may be processed accordingly such that the user may be incentivized to modify certain driving behaviors.

11 Claims, 7 Drawing Sheets

(56) References Cited

U.S. PATENT DOCUMENTS

| | | | |
|---|---|---|---|
| 2011/0301985 A1* | 12/2011 | Camp | G06Q 10/02 705/5 |
| 2012/0296727 A1* | 11/2012 | Gore et al. | 705/14.27 |
| 2013/0006674 A1* | 1/2013 | Bowne et al. | 705/4 |
| 2013/0006715 A1* | 1/2013 | Warkentin et al. | 705/7.38 |
| 2013/0046466 A1* | 2/2013 | Yucel | G01C 21/3469 701/538 |
| 2013/0079971 A1* | 3/2013 | Raghunathan | G07C 5/008 701/31.4 |
| 2013/0090821 A1* | 4/2013 | Abboud | G07C 5/085 701/70 |
| 2013/0110310 A1* | 5/2013 | Young | 701/1 |
| 2013/0141249 A1* | 6/2013 | Pearlman | H04Q 9/00 340/870.03 |
| 2013/0246301 A1* | 9/2013 | Radhakrishnan | G06Q 30/0282 705/347 |
| 2013/0297097 A1* | 11/2013 | Fischer et al. | 701/1 |
| 2013/0302758 A1* | 11/2013 | Wright | 434/65 |
| 2013/0325521 A1* | 12/2013 | Jameel | G06Q 10/02 705/5 |
| 2013/0332004 A1* | 12/2013 | Gompert et al. | 701/1 |
| 2014/0032062 A1* | 1/2014 | Baer | G07C 5/08 701/51 |
| 2014/0045147 A1* | 2/2014 | Mohn | G08G 1/00 434/69 |
| 2014/0080100 A1* | 3/2014 | Phelan | G06Q 40/00 434/66 |
| 2014/0095305 A1* | 4/2014 | Armitage et al. | 705/14.49 |
| 2014/0226010 A1* | 8/2014 | Molin | G06Q 10/06 348/148 |
| 2014/0272811 A1* | 9/2014 | Palan | 434/66 |
| 2014/0322676 A1* | 10/2014 | Raman | 434/65 |
| 2014/0328248 A1* | 11/2014 | Greubel | H04W 8/005 370/328 |
| 2015/0039175 A1* | 2/2015 | Martin et al. | 701/31.5 |
| 2015/0081404 A1* | 3/2015 | Basir | 705/14.1 |
| 2015/0112546 A1* | 4/2015 | Ochsendorf | B60W 50/14 701/33.4 |
| 2015/0118652 A1* | 4/2015 | Lawrenson et al. | 434/62 |
| 2015/0120336 A1* | 4/2015 | Grokop et al. | 705/4 |
| 2015/0213656 A1* | 7/2015 | Stacy | 701/31.5 |
| 2015/0254581 A1* | 9/2015 | Brahme | G06F 17/30241 705/5 |
| 2016/0003627 A1* | 1/2016 | Bonhomme | G01C 21/26 701/400 |
| 2016/0078394 A1* | 3/2016 | Fuldner | G06Q 10/063114 705/7.15 |
| 2016/0171574 A1* | 6/2016 | Paulucci | G07B 15/02 705/13 |
| 2016/0253617 A1* | 9/2016 | Truong | G06Q 10/063114 |
| 2016/0321771 A1* | 11/2016 | Liu | G06Q 50/30 |
| 2017/0203767 A1* | 7/2017 | Tibbitts | B60W 40/09 |

* cited by examiner

SYSTEMS AND METHODS FOR MANAGING AND PROCESSING VEHICLE OPERATOR ACCOUNTS BASED ON VEHICLE OPERATION DATA

FIELD OF THE DISCLOSURE

The present disclosure generally relates to analyzing vehicle operator performance. More particularly, the present disclosure may relate to systems and methods for collecting operation data during operation of a vehicle and processing accounts or profiles of vehicle operators based on the detected operation events.

BACKGROUND

There are numerous opportunities and circumstances in which individuals may operate vehicles, either rented vehicles or vehicles that the individuals may own. With the proliferation of the "sharing economy," these opportunities and circumstances are increasing. For example, individuals have increasing access to rental vehicles offered by rental car companies as well as to shared vehicles offered by car sharing companies. For further example, ride sharing services or transportation network companies enable individuals to use their own vehicles to transport other individuals who request rides.

Currently, there exist no systems to process an individual's driving performance when operating a vehicle either for vehicle rental, vehicle sharing, or ride sharing purposes. As a result, there are no safe driving incentives for individuals who operate vehicles in these circumstances, and individuals are not rewarded for their safe driving. Of course, any unsafe driving behaviors are generally priced into costs associated with the services, including vehicle repair and maintenance costs, as well as vehicle insurance. Further, passengers in ride sharing services are not able to gauge a performance of the drivers available in the ride sharing services.

Accordingly, there is an opportunity to effectively and accurately assess vehicle operator performance, as well as incentive/reward certain performance and avail relevant performance data associated with vehicle operators.

SUMMARY

According to one embodiment, a computer-implemented method of processing driver accounts associated with detected driver events in a vehicle is provided. The method includes associating a driver of the vehicle with an electronic device located within the vehicle, tracking operation of the vehicle by the driver, the tracking facilitated by a set of sensors associated with at least one of the electronic device and the vehicle and resulting in a set of vehicle operation data, and detecting a conclusion of the operation of the vehicle by the driver. The method further includes: responsive to detecting the conclusion, analyzing the set of vehicle operation data to calculate a quantitative driving score for the driver, determining, based on the quantitative driving score, that the driver is eligible for an incentive or reward, and applying the incentive or reward to an account associated with the driver.

In another embodiment, a computer-implemented method of processing driver accounts associated with detected driver events in a vehicle is provided. The method includes associating a driver of the vehicle with an electronic device located within the vehicle, detecting an initiation of a trip associated with the vehicle, the trip being facilitated by the driver, and tracking operation of the vehicle during the trip, the tracking facilitated by a set of sensors associated with at least one of the electronic device and the vehicle and resulting in a set of vehicle operation data. The method further includes detecting a conclusion of the trip, responsive to detecting the conclusion, analyzing the set of vehicle operation data to calculate a quantitative driving score for the driver, and adjusting a driver rating of the driver based on the quantitative driving score.

In a further embodiment, an electronic device associated with a vehicle for processing driver accounts associated with detected driver events in the vehicle is provided. The electronic device includes a communication interface configured to collect data, a memory adapted to store non-transitory computer executable instructions included in an application, and a particularly programmed processor adapted to interface with the communication interface. The processor is configured to execute the application to cause the processor to: associate a driver of the vehicle with the electronic device located within the vehicle, track, via the communication interface, operation of the vehicle by the driver, the tracking facilitated by a set of sensors associated with at least one of the electronic device and the vehicle and resulting in a set of vehicle operation data, detect a conclusion of the operation of the vehicle by the driver, responsive to detecting the conclusion, analyze the set of vehicle operation data to calculate a quantitative driving score for the driver, determine, based on the quantitative driving score, that the driver is eligible for an incentive or reward, and apply the incentive or reward to an account associated with the driver.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
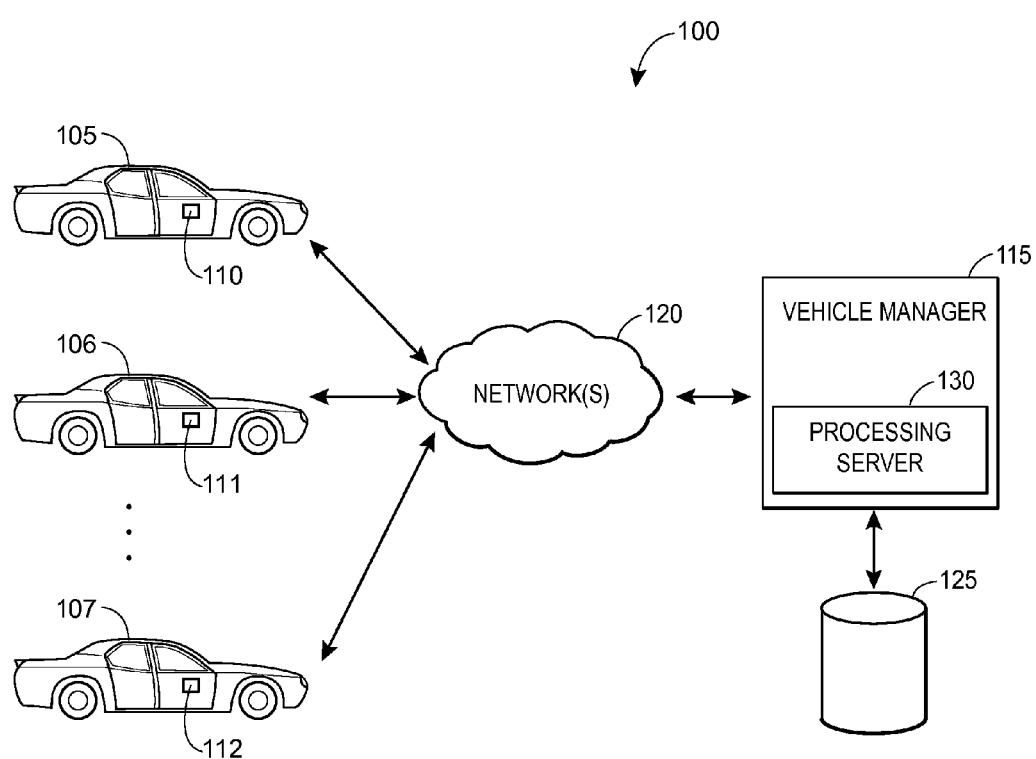
FIG. 1 depicts an exemplary environment including components and entities associated with collecting vehicle operation data and processing operator accounts or profiles accordingly, in accordance with some embodiments.

The present systems and methods relate to collecting operation data from vehicles and processing accounts or profiles associated with operators of the vehicles. The systems and methods may be facilitated by one or more electronic devices or components that are associated with or otherwise located within vehicles. In particular, the electronic devices may be mobile devices belonging to individuals (e.g., a tablet or smartphone), on-board telematics platforms installed in the vehicles, and/or sets of sensors in the vehicles. The electronic devices may connect to one or more back-end servers, such as back-end servers associated with a vehicle manager entity (e.g., a vehicle rental agency, a transportation network company, or the like).

In operation, an individual may register or otherwise associate himself/herself with a vehicle and one or more electronic devices thereof, such that the individual may be deemed the vehicle operator or driver. Operation of the vehicle may be initiated, where the operation may be trip-based (e.g., going from a departure location to a destination location) or ignition-based, whereby the vehicle is operating when the ignition of the vehicle is "on." During operation of the vehicle, a set of operation data may be sensed and collected by one or more of the electronic devices or components. In particular, acceleration, velocity, braking, turning, and other operating data may be collected and sensed. In some embodiments, the one or more electronic devices or components may transmit the collected set of operation data to the back-end server(s).

The systems and methods may analyze the set of operation data to identify various operation/driving events, such as accelerations, instances of exceeding the speed limit, hard brakes, hard turns, contact with other vehicles or objects, and/or other driving events. Based on the detected driving events, the systems and methods may calculate a driving score for an individual to reflect a performance of the individual on a particular operating instance of the vehicle. The driving score may be a quantitative or qualitative measure that may be compared against various baseline or threshold measurements.

According to embodiments, the systems and methods may also facilitate various functionalities associated with the calculated driving score. In one implementation, the systems and methods may determine a reward, credit, discount, or the like (or a penalty, surcharge, or the like) based on the calculated driving score. In another implementation, such as in a ride sharing service, the systems and methods may adjust a rating or other metric of a driver based on the calculated driving score. Of course, it should be appreciated that additional functionalities are envisioned.

The systems and methods therefore may offer numerous benefits. In particular, drivers or operators may be appropriately rewarded or penalized for any detected driving events. The rewards/penalties may therefore incentivize drivers to exercise greater care and caution when operating vehicles, resulting in fewer incidents, damage, and injuries. As a further result, the costs associated with repairing and insuring the vehicles are reduced and the savings may be passed down to customers, such as customers who rent vehicles. Additionally, drivers who participate in ride sharing services may see their driver profiles improve, thus attracting passengers to those particular drivers. It should be appreciated that additional benefits associated with the systems and methods are envisioned.

FIG. 1 depicts an example environment 100 associated with collecting vehicle operation data and facilitating various associated functionalities including processing operator accounts or profiles. Although FIG. 1 depicts certain entities, components, and devices, it should be appreciated that fewer, additional, or alternate entities and components are envisioned.

As illustrated in FIG. 1, the environment 100 includes a set of vehicles 105, 106, 107 which may be, for example, cars, trucks, motorcycles, motorbikes, scooters, boats, recreational vehicles, or any other type of vehicle capable of being operated or driven by a vehicle driver or operator. Although FIG. 1 depicts three (3) vehicles 105, 106, 107, it should be appreciated that fewer or more vehicles are envisioned. Each of the vehicles 105, 106, 107 has one or more respective electronic devices 110, 111, 112 associated therewith. In particular, the electronic devices 110, 111, 112 may be respectively installed as an on-board telematics platform of the vehicles 105, 106, 107, such as part of an original equipment manufacturer (OEM) installation on the vehicles 105, 106, 107. Further, the respective electronic device 110 may belong to a respective individual associated with the vehicles 105, 106, 107 such as an operator or a passenger. For example, the electronic device 110, 111, 112 may be any one of smartphones, notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like.

It should be appreciated that each of the vehicles 105, 106, 107 may include multiple electronic devices. For example, the vehicle 105 may include an on-board telematics platform as well as a mobile device of the vehicle operator. The multiple electronic devices are capable of communicating with each other. For example, an on-board telematics platform may collect vehicle operation data and transmit the vehicle operation data to a smartphone of the vehicle operator. It should further be appreciated that the vehicles 105, 106, 107 may have different amounts of respective electronic devices 110, 111, 112 (e.g., the vehicle 105 may include a smartphone and an on-board telematics platform, and the vehicle 106 may include a tablet).

Although not illustrated in FIG. 1, in some implementations each of the vehicles 105, 106, 107 may include a set of sensors configured to detect and collect various telematics data. According to some implementations, the set of sensors may include any type of sensor configured to detect vehicle movement or general operation including, for example, a braking sensor, a speedometer, a tachometer, a throttle position sensor, an accelerometer, an optical sensor, a microphone, a gyroscope, a location module (e.g., GPS sensor), and/or others. The set of sensors are generally configured to measure vehicle operation data. In some specific instances, the set of sensors may also be used to monitor vehicle lane deviation, vehicle swerving, vehicle lane centering, vehicle acceleration along a single axis or multiple axes, and vehicle distance to other objects. It should be appreciated that these types of sensors and measurable metrics are merely examples and that other types of sensors and measurable metrics are envisioned. Each of the electronic devices 110, 111, 112 may interface with the set of sensors to retrieve any recorded vehicle operation data.

In some implementations, the electronic devices 110, 111, 112 may themselves include a set of sensors configured to collect telematics data. For example, a smartphone may have a built-in accelerometer, location module, optical sensor, and/or the like. For further example, an on-board telematics platform may be configured to collect braking data, acceleration data, location data, turning data, and/or other data associated with operation of the respective vehicle. Effectively, the set of electronic devices 110, 111, 112 may be configured to collect relevant vehicle operation data via interfacing with sensors of the vehicles 105, 106, 107, via interfacing with additional electronic devices within the vehicles 105, 106, 107, and/or via collecting data themselves.

The electronic devices 110, 111, 112 can each be configured to communicate with a vehicle manager 115 via a network 120. The network 120 can facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, Wi-Fi, and/or others). The vehicle manager 115 can be any individual, group of individuals, company, corporation, or other type of entity that can receive data from the electronic devices 110, 111, 112 and process any of the functionalities discussed herein. For example, the vehicle manager 115 may be a car rental agency having vehicles available for rental by customers. For further example, the vehicle manager 115 may be central server associated with a transportation network company such as a ride sharing service. According to embodiments, the vehicle manager 115 can include one or more processing server(s) 130 configured to facilitate various of the functionalities as discussed herein. Although FIG. 1 depicts the processing server 130 as a part of the vehicle manager 115, it should be appreciated that the processing server 130 can be separate from (and connected to or accessible by) the vehicle manager 115.

The processing server 130 may maintain accounts or profiles associated with operators of the vehicles 105, 106, 107. For example, an operator may have an account with a vehicle rental agency, whereby the account may maintain payment information, discount or credit information, operator performance data, and/or other information. For further example, an operator may have a profile with a transportation network company, where the profile maintains an operator rating (e.g., a score from 1-5), reviews, and/or other information. The processing server 130 may interface with a database 125 to store and retrieve data, such as data relating to the accounts or profiles of the operator, collected or processed vehicle operation data, and/or other data.

According to embodiments, the operators (and the telematics data collection) have a temporary association with the vehicles 105, 106, 107. For example, an operator may rent one of the vehicles 105, 106, 107 from a vehicle rental agency. For further example, an operator may use his or her own vehicle in a ride sharing service to transport a passenger from an origin to a destination, whereby any usage by the operator outside of the ride sharing service may not be factored into any driving assessment. Accordingly, the temporary association may be repeated over time. These scenarios are in contrast to normal operation of a vehicle by the vehicle owner or someone who normally operates the vehicle.

Figure 2:
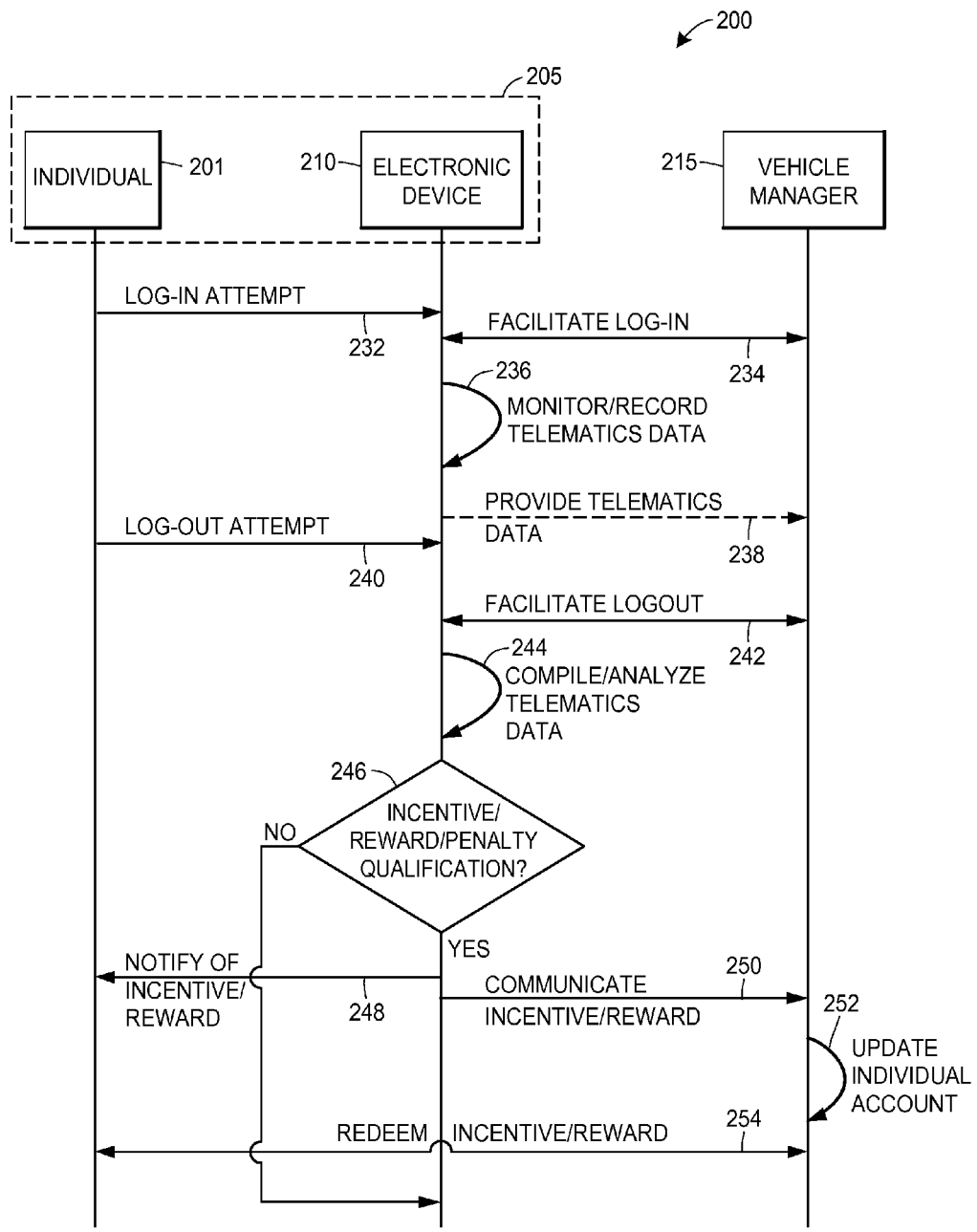
FIG. 2 depicts an exemplary signal diagram associated with collecting vehicle operation data and processing operator accounts or profiles accordingly, in accordance with some embodiments.

Referring to FIG. 2, illustrated is an exemplary signal diagram 200 associated with collecting vehicle operation data and facilitating various functionalities relating thereof. FIG. 2 includes an individual 201, an electronic device 210 (such as the electronic device 110 as discussed with respect to FIG. 1), and a vehicle manager 215 (such as the vehicle manager 115 as discussed with respect to FIG. 1). The vehicle manager 215 may include one or more processing servers (such as the processing server 130 as discussed with respect to FIG. 1) that facilitate various of the functionalities. The electronic device 210 and the vehicle manager 215 may exchange data and information via a network connection (such as one of more of the network(s) as discussed with respect to FIG. 1).

The individual 201 and the electronic device 210 may be located within or otherwise associated with a vehicle 205 (such as the vehicle 105 as discussed with respect to FIG. 1). According to embodiments, the individual 201 may be driver or operator of the vehicle 205. Further, the electronic device 210 may belong to the individual 201 (e.g., a smartphone of the individual 201) or may be installed within the vehicle 205 (e.g., an on-board telematics platform). As discussed above with respect to FIG. 1, there may be multiple electronic devices 210 configured to collect and process relevant vehicle operation data. In one embodiment, the electronic device 210 may interface with an existing telematics platform of the vehicle and/or with a set of sensors of the vehicle.

The signal diagram 200 may begin when the individual 201 attempts (232) to log into the electronic device 210 or otherwise associate him/herself with the electronic device 210. In some implementations, the electronic device 210 may support a dedicated application associated with the vehicle manager 215. For example, if the vehicle manager 215 is a transportation network company, the individual 201 may log into an operator-specific version of an application that maintains trip stats and a driver rating. For further example, if the vehicle manager 215 is a vehicle rental agency, the electronic device 210 may support a vehicle rental application configured to track operation of the vehicle 205 as well as monitor the terms of a vehicle rental agreement (e.g., duration, mileage, etc.). Because the vehicle 205 may be a rental vehicle, the electronic device 210 may enable various individuals to associate themselves therewith, as over the course of a time period, the rental vehicle may have a plurality of operators.

The electronic device 210 may facilitate (234) a login of the individual 201 with the vehicle manager 215. In particular, the individual 201 may have an account, profile, agreement, or some other association with the vehicle manager 215. For example, if the vehicle manager 215 is a transportation network company, then the individual 201 may be a driver for a ride sharing service and may be able to log into a dedicated application while "on duty" (i.e., available to pick up and transport passengers), or when the driver picks up an individual for a trip.

In some implementations, the individual 201 may associate him/herself with the electronic device 210 by making a selection on the electronic device 210. For example, the individual 201 may explicitly select to initiate a trip. In other implementations, the electronic device 210 may automatically associate the individual 201 with the electronic device 210. For example, the electronic device 210 may detect ignition of the vehicle 205, and may already have an identification of the individual 201 programmed. For further example, the electronic device 210 may detect the individual 201 via a short-range communication (e.g., NFC, RFID, Bluetooth®, etc.), via biometrics, or via other detection mechanisms.

After the individual 201 is logged into the electronic device 210 or otherwise associated with the electronic device 210 (or the vehicle 205), the electronic device 210 may monitor (236) or otherwise record various telematics data that corresponds to the operation of the vehicle 205 (generally, a set of operation data). According to embodiments, the electronic device 210 may collect, monitor, and/or record the telematics data throughout operation of the vehicle 205, and/or whenever the individual 201 is associated with the vehicle 205. For example, if the individual 201 rents the vehicle 205 for a three (3) day period, the electronic device 210 may monitor the telematics data whenever the individual 201 operates the vehicle 205 within that three (3) day period. For further example, if the individual 201 is driving a passenger from an origin to a destination (i.e., a trip), then the electronic device 210 may monitor the telematics data during the trip. In some implementations, the individual 201 may specify when the set of operation data should be collected/recorded and when the set of operation data should not be collected/recorded. In other implementations, the vehicle 205 or the electronic device 210 may automatically detect or determine when the set of operation data should be collected/recorded.

As discussed herein, the telematics data may be sensed or recorded by a set of sensors such as a braking sensor, a speedometer, a tachometer, a throttle position sensor, an accelerometer, an optical sensor, a microphone, a gyroscope, a location module (e.g., GPS sensor), and/or others. Further, the telematics data may constitute any movement data, location data, or any other data associated with the operation of the vehicle 205. For example, the telematics data may include vehicle lane deviation, vehicle swerving, vehicle lane centering, vehicle acceleration along a single axis or multiple axes, turning data, route data, speed data, vehicle distance to other objects, and/or other data. It should be appreciated that these types of sensors and measurable metrics are merely examples and that other types of sensors and measurable metrics are envisioned. In some implementations, the electronic device 210 may store the recorded telematics data in memory. In some optional implementations, the electronic device 210 may provide (238) the recorded telematics data to the vehicle manager 215, where the vehicle manager 215 may store the recorded telematics data in memory.

At some point in time, the individual 201 may attempt (240) to log out of the application or otherwise disassociate with the vehicle 205/electronic device 210. In some embodiments, the individual 201 may select to end a metering operation of the application. In some scenarios, the individual 201 may complete a rental period with the vehicle 205. In other scenarios, the individual 201 may complete a trip with a passenger. It should be appreciated that other scenarios for the individual 201 ending a trip, session, period, or the like with the application and/or the vehicle 205 are envisioned. In some implementations, the electronic device 210 may facilitate (242) the logout with the vehicle manager 215, such that the vehicle manager 215 can record the disassociation, the completed trip, the end of the rental period, or the like.

The electronic device 210 may compile/analyze (244) the telematics data. In particular, the electronic device 210 may compile/analyze the telematics data to identify any driving events associated with the operation of the vehicle 205. As the telematics data is collected in a raw format, the compilation and analysis may identify any driving events that correspond to any portions of the telematics data. For example, the telematics data may indicate a sudden deceleration, which the electronic device 210 may determine to be a hard braking event. For further example, the telematics data may indicate a traveling speed of 100 mph, which the electronic device 210 may determine to be an excessing speeding event.

The electronic device 210 may also calculate a driving score or similar metric that may reflect a performance of the individual 201 during operation of the vehicle 205. In embodiments, the driving score may be based on the type(s) and amount(s) of any identified driving event(s). For example, any "positive" driving events (e.g., staying under the speed limit, staying on a determined route, etc.) may positively influence the driving score and any "negative" driving events (e.g., hard brakes, sudden accelerations, etc.) may negatively influence the driving score.

Based on the analysis, the electronic device 210 may determine (246) whether the individual 201 qualifies for an incentive, reward, penalty, and/or the like. In particular, the electronic device 210 may identify any incentives, rewards, or the like (or in some cases, penalties, surcharges, or the like) that the individual 201 may qualify for based on the telematics data, any identified driving events, and/or the calculated driving score. For example, the incentive or reward may be a discount, a monetary award or payment, a positive rating, a negative rating, a surcharge, and/or the like.

In some implementations, the incentive or reward qualification may be based on the calculated driving score meeting or exceeding a qualitative or quantitative threshold. In some scenarios, the electronic device 210 may determine that a calculated driving score exceeds a certain threshold value, and as a result qualifies the individual 201 for an incentive or reward. There may be a series of quantitative or qualitative threshold values, whereby different threshold values correspond to different incentives or rewards. For example, if the individual maintains a rating of 4.8 out of 5.0 over the course of twenty (20) rental periods, then the individual may qualify for a free vehicle rental. For further example, if a driving score for the individual 201 on a certain trip indicates multiple "negative" driving events, then the rating for the individual 201 may be subject to a reduction. In some implementations, the incentive may be associated with a vehicle insurance policy of the individual. For example, the incentive may be a discount on an insurance premium.

If the electronic device 210 determines that the individual 201 does not qualify for an incentive or reward ("NO"), processing may end or return to any previous functionality. If the electronic device 210 determines that the individual 201 does qualify for an incentive or reward penalty ("YES"), the electronic device 210 may notify (248) the individual 201 of the incentive or reward. In some embodiments, the electronic device 210 may display a notification (e.g., via a dedicated application) indicating the incentive or reward. It should be appreciated that other communication channels for notifying of the incentive or reward are envisioned.

The electronic device 210 may also communicate (250) the incentive or reward to the vehicle manager 215, or otherwise notify the vehicle manager 215 of the incentive or reward. The vehicle manager 215 may then update or reconcile (252) an account or profile associated with the individual 201 to reflect the incentive or reward. In particular, the vehicle manager 215 may update a user profile associated with an application or service that facilitated the collection of the telematics data. In this regard, the user profile will be updated to reflect the incentive or reward when the individual 201 attempts to redeem or otherwise access the incentive or reward.

The individual 201 may subsequently attempt to redeem (254) or access the incentive or reward. For example, the individual 201 may attempt to redeem a discount or a monetary award. For further example, the individual 201 may attempt to access a driver profile that includes a rating based on the collected telematics data. It should be appreciated that other types of incentive/reward redeeming or accessing are envisioned.

FIGS. 3A, 3B, 4A and 4B illustrate exemplary interfaces associated with presenting various telematics data and associated functionalities with the telematics data. An electronic device (e.g., a mobile device such as a smartphone) may be configured to display the interfaces and/or receive selections and inputs via the interfaces. For example, a dedicated application associated with a vehicle manager and configured to operate on the electronic device may display the interfaces. It should be appreciated that the interfaces are merely exemplary and that alternative or additional content is envisioned.

Figure 3A:
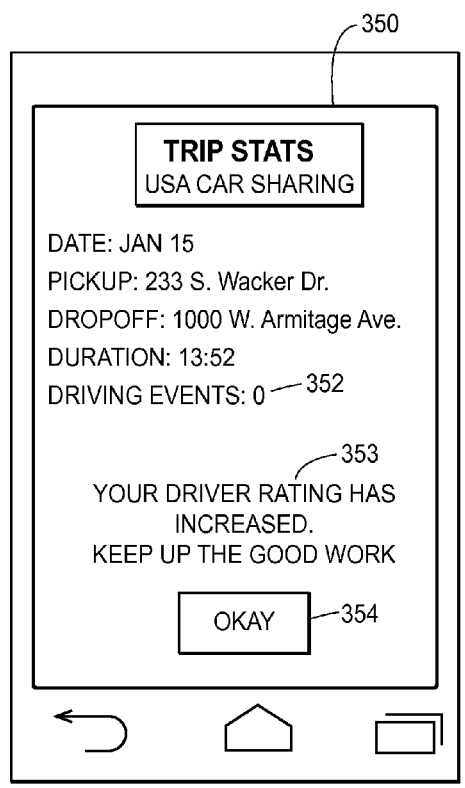
FIGS. 3A and 3B depict exemplary interfaces associated with presenting vehicle operation data and an associated operator profile, in accordance with some embodiments.
Figure 3B:
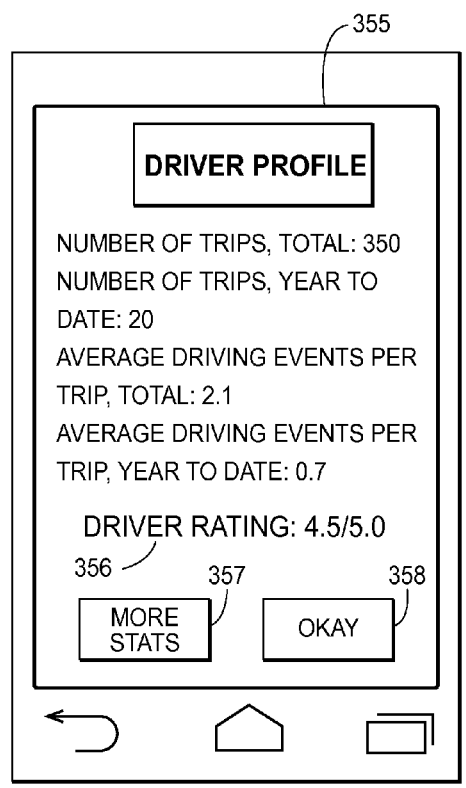

FIGS. 3A and 3B include interfaces that are associated with an exemplary ride sharing service. The electronic device may belong to a driver who participates in the ride sharing service by driving individuals on trips. The driver may have a driver profile that is associated with the ride sharing service, where the driver profile includes a driver rating that may reflect a performance of the driver based on any collected telematics data. In some embodiments, the driver rating may be a cumulative rating that may be adjusted for each subsequent trip based on the collected telematics data and any identified driving events.

Referring to FIG. 3A, an interface 350 includes a summary of an exemplary trip performed by the driver. The summary includes various information associated with the trip, such as the date, pickup location, dropoff location, and trip duration. The summary further includes an amount 352 of detected driving events (as shown: 0). According to embodiments, a driving event may be associated with a negative or undesirable driving event or occurrence. For example, a driving event may include a hard brake, a rapid acceleration, a hard turn, a swerve, and/or another occurrence. It should be appreciated that "positive" or desirable driving events are also envisioned.

The interface 350 further includes a description 353 of the trip summary. As shown in FIG. 3A, the description 353 indicates that the driver rating for the driver has increased, presumably because the driver did not experience any driving events during the trip. In some scenarios, the increased rating may result in the driver attracting additional customers or the driver qualifying for certain rewards or incentives. The driver may dismiss the interface 350 and proceed to another interface via an "OKAY" selection 354.

FIG. 3B illustrates another interface 355 that is associated with the driver profile. In particular, the interface 355 includes various statistics and information associated with the trips that the driver has completed for the ride sharing service. The interface 355 includes various information such as number of total trips, number of trips (year to date), and average driving events per trip, average driving events per trip (year to date). The interface 355 also includes a driving rating 356 that may reflect an aggregate performance of the driver during the trips. As shown in FIG. 3B, the driving rating 356 is 4.5/5.0. The interface 355 enables the driver to view more statistics via a "MORE STATS" selection 357 and enables the driver to dismiss the interface 355 and proceed to another interface via an "OKAY" selection 358.

Figure 4A:
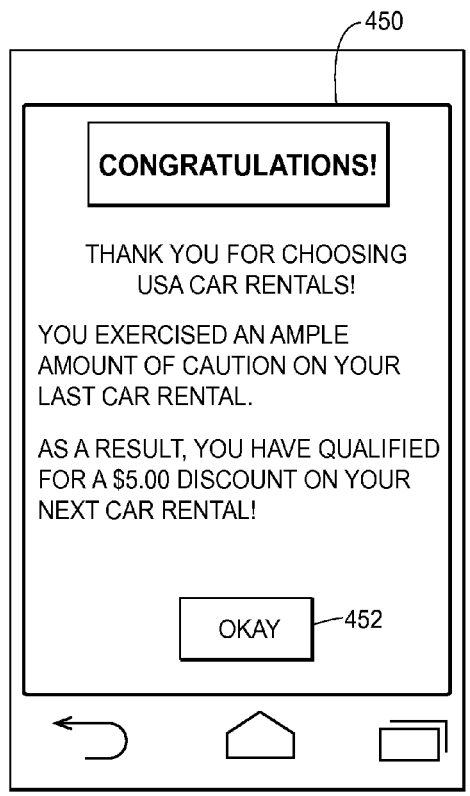
FIGS. 4A and 4B depict exemplary interfaces associated with presenting vehicle operation data and associated operator account information, in accordance with some embodiments.
Figure 4B:
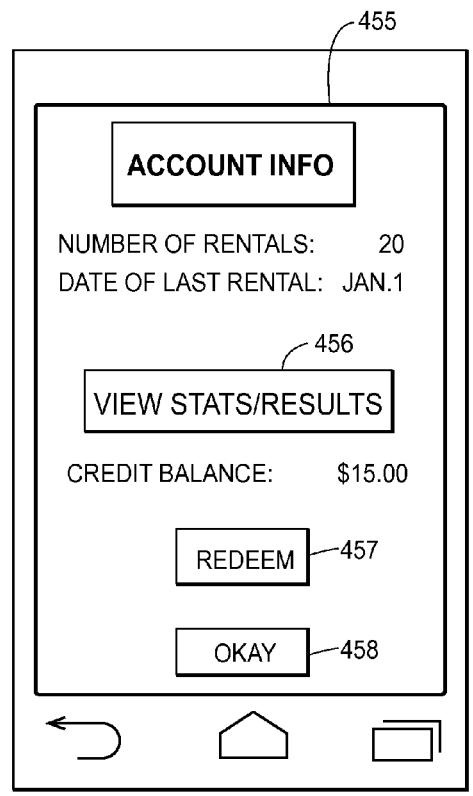

FIGS. 4A and 4B include interfaces that are associated with an exemplary vehicle rental service. The electronic device may belong to an individual who rents a vehicle from the vehicle rental service. The individual may install, on the electronic device, a dedicated application associated with the vehicle rental service, or may otherwise access the interfaces via a web browser.

Referring to FIG. 4A, an interface 450 includes a summary of a vehicle rental instance. In particular, the electronic device may display the interface 450 upon the individual returning a rented vehicle. The interface 450 includes a summary of the vehicle rental according to telematics data collected during the vehicle rental. In particular, the summary indicates that the individual exercised an ample amount of caution during the vehicle rental (i.e., there may have been few or no "negative" driving events detected), which qualifies the individual for a $5.00 discount on a subsequent vehicle rental.

FIG. 4B illustrates another interface 455 that details information associated with an account that the individual has with the vehicle rental service. As illustrated in FIG. 4B, the information includes a number of rentals and a date of last rental, and enables the individual to view more stats and information via a "VIEW" selection 456. The interface 455 further includes a credit balance associated with the individual. In embodiments, the credit balance may reflect the amount of credits or discounts that the user has accrued over the course of renting the vehicles.

The interface 455 enables the individual to redeem any of the credits via a "REDEEM" selection 457. In particular, by selecting the "REDEEM" selection 457, the individual may be directed to an interface that enables the user to book an additional vehicle rental with a discount, or redeem the credits for other products or services. The interface 455 further includes an "OKAY" selection that enables the individual to dismiss the interface 455 and proceed to another interface.

Figure 5:
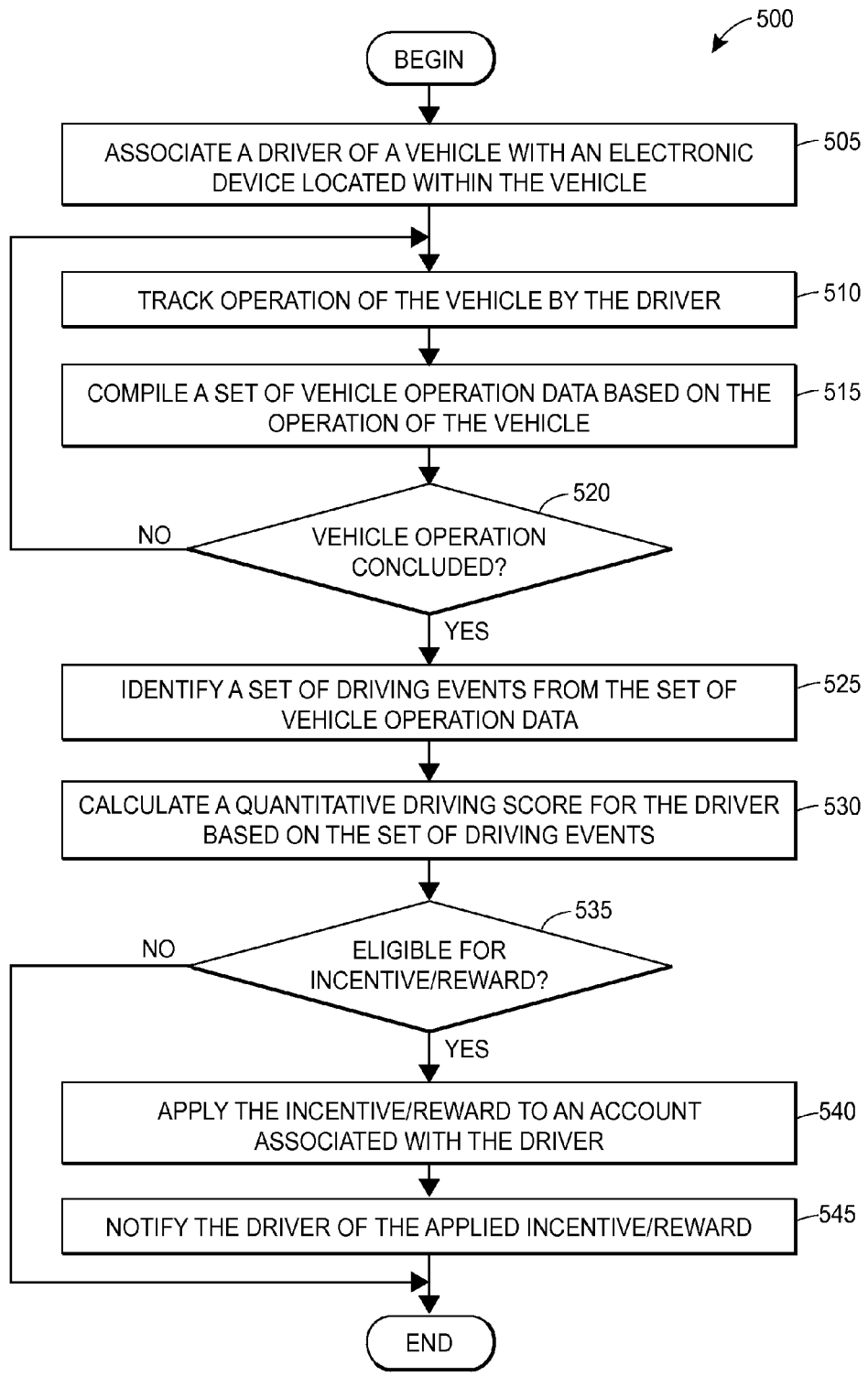
FIG. 5 depicts an exemplary flow diagram associated with collecting vehicle operation data and processing operator accounts or profiles accordingly, in accordance with some embodiments.

Referring to FIG. 5, depicted is a block diagram of an additional exemplary method 500 of processing driving accounts associated with detected driver events in a vehicle. The method 500 may be facilitated by an electronic device that may be in direct or indirect communication with a back-end server, such as a back-end server associated with a vehicle manager entity. The electronic device may support execution of an application associated with the vehicle manager entity. Further, the electronic device may enable a user (e.g., the driver) to make various selections and facilitate various functionalities. In some embodiments, the driver may be an individual who rents a vehicle from a vehicle rental agency. In other embodiments, the driver may be a vehicle operator in a ride sharing service. It should be appreciated that the driver may be another individual having an account that may be influenced by the driver's operation of the vehicle.

The method 500 may begin when the electronic device associates (block 505) the driver of the vehicle with the electronic device. In embodiments, the electronic device may be located within the vehicle and may also be configured to monitor, record, collect, or access telematics data associated with operation of the vehicle. The driver may associated with the electronic device, for example, by logging into the application executing on the electronic device. In some implementations, the back-end server may automatically associate the driver with the electronic device, such as if the driver rents the vehicle and signs a rental agreement.

The electronic device may track (block 510) operation of the vehicle by the driver. In particular, the electronic device may interface with a set of internal or external sensors, and/or with an on-board telematics platform, that measure telematics data associated with the vehicle during operation of the vehicle. The electronic device may collect or retrieve the telematics data from the sensors or other devices. The electronic device may also compile (block 515) a set of vehicle operation data based on the operation of the vehicle. The set of vehicle operation data may therefore represent the telematics data that is collected or recorded during operation of the vehicle. The electronic device may optionally transmit the set of vehicle operation data to the back-end server.

The electronic device may determine (block 520) whether the vehicle operation has concluded. In some scenarios, the vehicle operation may automatically conclude on a set time and/or date. In other scenarios, the vehicle operation may conclude upon a selection by the driver (e.g., such as if the driver has finished a trip). If the vehicle operation has not concluded ("NO"), processing may return to block 510 in which additional vehicle operation may be tracked. If the vehicle operation has concluded ("YES"), the electronic device may identify (block 525) a set of driving events from the set of vehicle operation data. In embodiments, the set of driving events may include any events or instances outside "normal" operation of the vehicle. For example, the set of driving events may include any hard turns, hard brakes, swerves, instances of speeding, hard accelerations, and/or the like. It should be appreciated that some of the set of driving events may be considered positive events, such as if the driver operates the vehicle under the speed limit or avoids a hazardous road condition.

The electronic device may calculate (block 530) a quantitative driving score for the driver based on the set of driving events. It should be appreciated that the electronic device may use a variety of techniques, calculations, or algorithms to calculate the quantitative driving score. Further, in calculating the quantitative driving score, the electronic device may factor for the relative positive or negative events included in the set of driving events. It should further be appreciated that the driving score may be qualitative (e.g., bad, fair, good, excellent, etc.). Based on the quantitative driving score, the electronic device may determine (block 535) whether the driver is eligible for an incentive or reward. In some implementations, the eligibility may be based on the quantitative driving score meeting or exceeding a certain threshold. It should be appreciated that different quantitative driving scores may quality for different incentives or rewards.

If the driver is not eligible for an incentive or reward ("NO"), processing may end or proceed to other functionality. If the driver is eligible for an incentive or reward ("YES"), the electronic device may apply (block 540) the incentive or reward to an account or profile associated with the driver. In particular, the electronic device may interface with the back-end server so that the back-end server may reflect the incentive or reward in the account of the driver and that the driver may subsequently access the account to assess an associated driver profile or qualified incentives/rewards. The electronic device may notify (block 545) the driver of the applied incentive or reward. In some embodiments, the electronic device may display a notification associated with the application, or notify the driver according to other communication channels.

Figure 6:
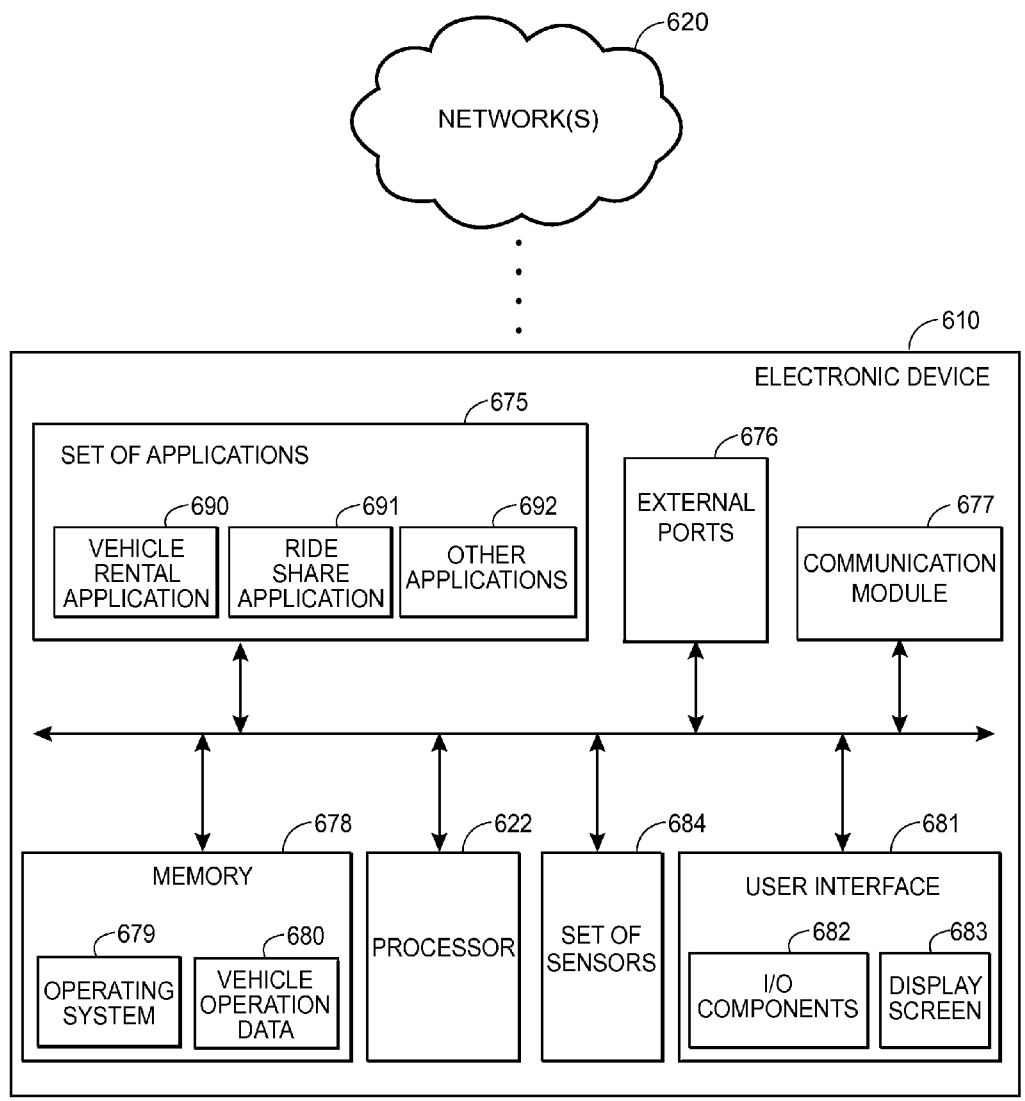
FIG. 6 is a block diagram of an exemplary electronic device in accordance with some embodiments.

FIG. 6 illustrates a diagram of an exemplary electronic device 610 (such as the electronic device 110 discussed with respect to FIG. 1) in which the functionalities as discussed herein may be implemented. It should be appreciated that the electronic device 610 may be configured to be transported in a vehicle and/or connect to an on-board telematics platform of the vehicle, as discussed herein.

The electronic device 610 may include a processor 622 as well as a memory 678. The memory 678 may store an operating system 679 capable of facilitating the functionalities as discussed herein as well as a set of applications 675 (i.e., machine readable instructions). For example, one of the set of applications 675 may be a vehicle rental application 690 configured to interface with a vehicle rental agency, and a ride share application 691 configured to interface with a transportation network company. It should be appreciated that one or more other applications 692 are envisioned, such as an application associated with an insurance provider.

The processor 622 may interface with the memory 678 to execute the operating system 679 and the set of applications 675. According to some embodiments, the memory 678 may also store vehicle operation data 680 that is collected during operation of a vehicle. In some implementations, the vehicle rental application 690 and/or the ride share application 691 may store the vehicle operation data 680 in the memory 687. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 610 may further include a communication module 677 configured to communicate data via one or more networks 620. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676. Further, the communication module 677 may include a short-range network component (e.g., an RFID reader) configured for short-range network communications. For example, the communication module 677 may receive, via the network 620, telematics data from an on-board telematics platform or from a set of sensors of a vehicle. For further example, the communication module 677 may transmit data to and receive data from a back-end server via the network 620. The electronic device 610 may further include a set of sensors 684 (e.g., a location module, an accelerometer, orientation sensor, etc.). Although not shown in FIG. 6, the electronic device 610 may further include any biometrics readers or components to enable authentication with an individual.

The electronic device 610 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs, speakers, microphones). According to some embodiments, the user may access the electronic device 610 via the user interface 681 to make various selections, log into any of the set of applications 675, and/or perform other functions. In some embodiments, the electronic device 610 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 622 (e.g., working in connection with the operating system 679) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Figure 7:
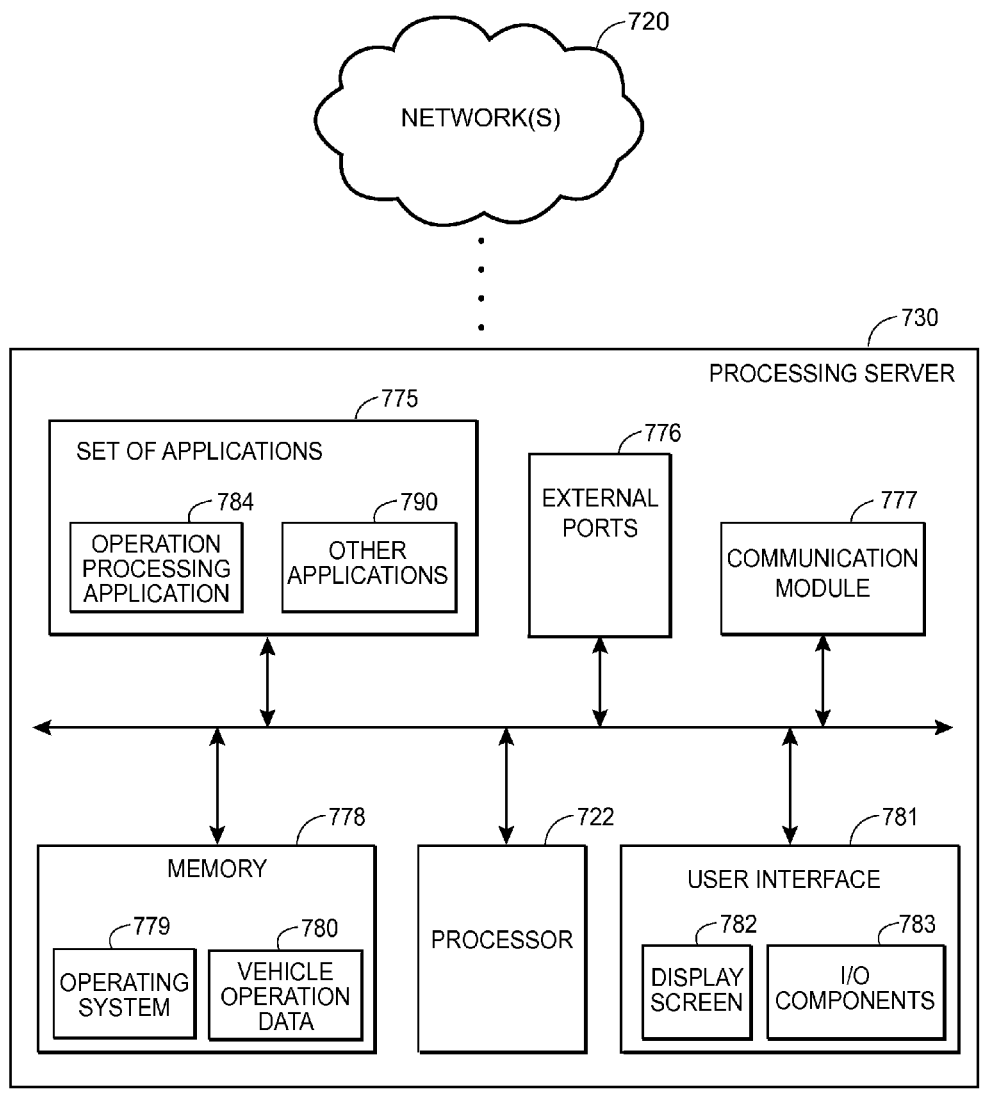
FIG. 7 is a block diagram of an exemplary processing server in accordance with some embodiments.

FIG. 7 illustrates a diagram of an exemplary processing server 730 (such as the processing server 130 as discussed with respect to FIG. 1) in which the functionalities as discussed herein may be implemented. It should be appreciated that the processing server 730 may be associated with a vehicle manager entity, as discussed herein.

The processing server 730 may include a processor 722, as well as a memory 778. The memory 778 may store an operating system 779 capable of facilitating the functionalities as discussed herein as well as a set of applications 775 (i.e., machine readable instructions). For example, one of the set of applications 775 may be an operation processing application 784 configured to analyze vehicle operation data and determine any corresponding incentives or rewards. It should be appreciated that other applications 790 are envisioned.

The processor 722 may interface with the memory 778 to execute the operating system 779 and the set of applications 775. According to some embodiments, the memory 778 may also store vehicle operation data 780 received from electronic devices associated with vehicles. Although not shown in FIG. 7, the memory 778 may also store user account or profile data such that the operation processing application 784 may update or modify any user accounts or profiles based on an analysis of the vehicle operation data 780. The memory 778 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing server 730 may further include a communication module 777 configured to communicate data via one or more networks 720. According to some embodiments, the communication module 777 may include one or more transceivers (e.g., WWAN, WLAN, and/or WPAN transceivers) functioning in accordance with IEEE standards, 3GPP standards, or other standards, and configured to receive and transmit data via one or more external ports 776. For example, the communication module 777 may receive, via the network 720, usage events detected by an electronic device traveling in a vehicle. The processing server 730 may further include a user interface 781 configured to present information to a user and/or receive inputs from the user. As shown in FIG. 7, the user interface 781 may include a display screen 782 and I/O components 783 (e.g., ports, capacitive or resistive touch sensitive input panels, keys, buttons, lights, LEDs, speakers, microphones). According to some embodiments, the user may access the processing server 730 via the user interface 781 to process various user accounts and/or perform other functions. In some embodiments, the processing server 730 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 722 (e.g., working in connection with the operating system 779) to facilitate the functions as described herein. In this regard, the program code may be implemented in any desired language, and/or may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of processing driver accounts associated with detected driver events in a vehicle, the method comprising:

detecting, by an electronic device located within the vehicle, a driver of the vehicle via a short-range communication;

detecting, within an application executing on the electronic device, a selection by the driver to initiate a trip;

facilitating a login of the driver with a vehicle manager entity associated with the vehicle, the login resulting in a temporary association of the driver with the vehicle for the trip, wherein the driver has a cumulative driver rating reflective of at least one prior performance by the driver during at least one prior temporary association with the vehicle;

after facilitating the login, tracking, by one or more processors associated with the electronic device, operation of the vehicle by the driver during the trip, the tracking facilitated by a set of sensors associated with at least one of the electronic device and the vehicle and resulting in a set of vehicle operation data, the set of sensors including at least an accelerometer;

detecting a logout of the driver with the vehicle manager entity, the logout reflective of a conclusion of (i) the operation of the vehicle by the driver and (ii) the temporary association of the driver with the vehicle;

responsive to detecting the logout, analyzing, by the one or more processors associated with the electronic device the set of vehicle operation data to calculate, for the driver, a quantitative driving score associated with the operation of the vehicle;

adjusting the cumulative driver rating for the driver to reflect the quantitative driving score; and determining, by the one or more processors associated with the electronic device, that the driver qualifies for a reward when the cumulative driver rating has maintained at least a threshold rating over a course of the temporary association and the at least one prior temporary association.

2. The computer-implemented method of claim 1, wherein the facilitating the login comprises:

enabling the driver to log into the application executing on the electronic device.

3. The computer-implemented method of claim 1, wherein the tracking the operation of the vehicle by the driver comprises:

detecting initiation of the operation of the vehicle by the driver; and responsive to detecting the initiation of the operation of the vehicle, tracking the operation of the vehicle by the driver.

4. The computer-implemented method of claim 1, wherein the tracking the operation of the vehicle by the driver comprises:

retrieving, by the electronic device, the set of vehicle operation data from a telematics platform associated with the vehicle, the telematics platform connected to the set of sensors.

5. The computer-implemented method of claim 1, wherein the detecting the logout of the driver comprises:

receiving, from the driver via the electronic device, a selection of the conclusion of the operation of the vehicle.

6. The computer-implemented method of claim 1, wherein the analyzing the set of vehicle operation data to calculate the quantitative driving score for the driver comprises:

identifying a set of driving events from the set of vehicle operation data; and calculating the quantitative driving score for the driver based on the set of driving events.

7. An electronic device associated with a vehicle for processing driver accounts associated with detected driver events in the vehicle, comprising:

a communication interface for collecting data;

a memory storing non-transitory computer executable instructions included in an application; and a particularly programmed processor interfaced with the communication interface, wherein the processor executes the application to cause the processor to:

detect a driver of the vehicle via a short-range communication;

detect, within the application, a selection by the driver to initiate a trip;

facilitate a login of the driver with a vehicle manager entity associated with the vehicle, the login resulting in a temporary association of the driver with the vehicle for the trip, wherein the driver has a cumulative driver rating reflective of at least one prior performance by the driver during at least one prior temporary association with the vehicle;

after facilitating the login, track, via the communication interface, operation of the vehicle by the driver during the trip, the tracking facilitated by a set of sensors associated with at least one of the electronic device and the vehicle and resulting in a set of vehicle operation data, the set of sensors including at least an accelerometer;

detect a logout of the driver with the vehicle manager entity, the logout reflective of a conclusion of (i) the operation of the vehicle by the driver and (ii) the temporary association of the driver with the vehicle;

responsive to detecting the logout, analyze the set of vehicle operation data to calculate, for the driver, a quantitative driving score associated with the operation of the vehicle;

adjust the cumulative driver rating for the driver to reflect the quantitative driving score; and determine that the driver qualifies for a reward when the cumulative driver rating has maintained at least a threshold rating over a course of the temporary association and the at least one prior temporary association.

8. The electronic device of claim 7, wherein to facilitate the login, the processor is configured to:

enable the driver to log into the application.

9. The electronic device of claim 7, wherein to track the operation of the vehicle by the driver, the processor is configured to:

retrieve, via the communication interface, the set of vehicle operation data from a telematics platform associated with the vehicle, the telematics platform connected to the set of sensors.

10. The electronic device of claim 7, wherein to detect the logout of the driver, the processor is configured to:

receive, from the driver, a selection of the conclusion of the operation of the vehicle.

11. The electronic device of claim 7, wherein to analyze the set of vehicle operation data to calculate the quantitative driving score for the driver, the processor is configured to:

identify a set of driving events from the set of vehicle operation data; and calculate the quantitative driving score for the driver based on the set of driving events.

\* \* \* \* \*